Aug. 9, 1960  A. CLAAS  2,948,427
APPARATUS FOR HANDLING A LOAD
Filed March 5, 1957  2 Sheets-Sheet 1

Inventor:
August Claas
By Richards & Geier
ATTORNEYS

Aug. 9, 1960 A. CLAAS 2,948,427
APPARATUS FOR HANDLING A LOAD
Filed March 5, 1957 2 Sheets-Sheet 2
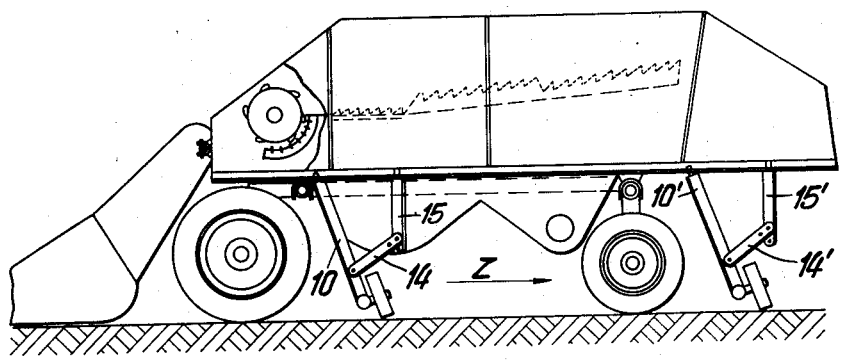
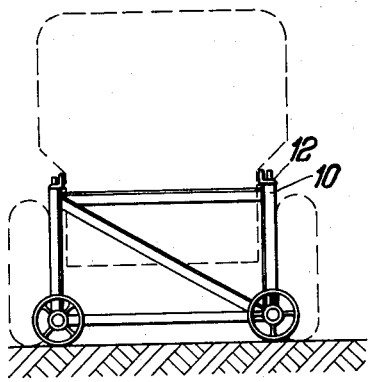
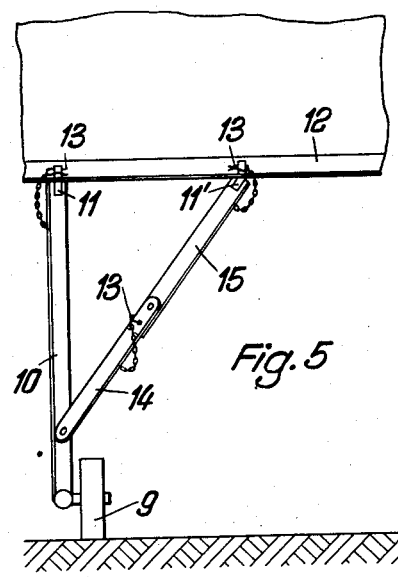
Inventor:
August Claas

2,948,427
APPARATUS FOR HANDLING A LOAD

August Claas, 64 Neustrasse, Harsewinkel, Germany

Filed Mar. 5, 1957, Ser. No. 644,082

Claims priority, application Germany July 14, 1956

2 Claims. (Cl. 214—515)

The present invention relates to a method of mounting and dismounting a combine-harvester on a vehicle with interchangeable work-implements, in particular agricultural work-implements such as ploughs, hoeing machines, rakes, drilling machines and the like. According to the spirit of the invention therefore the combine-harvester is a work-implement.

The practice is already known in the case of vehicles for carrying implements, in particular agricultural implements, of mounting a combine-harvester in such a manner as to make it self-propelled. In this case, it is necessary to employ a crane or winch device to mount or dismount the combine-harvester body, the vehicle chassis being driven beneath or from beneath the raised or elevated combine-harvester body. Generally, however, such raising or elevating apparatus is available only in workshops. The procuring of such raising or elevating apparatus merely for the mounting and dismounting of the combine-harvester body would represent a heavy financial burden for an agricultural concern, especially where it also involved the provision of suitable accommodation. A further disadvantage encountered here is that the parts of the combine-harvester involved in the raising operation are dented and twisted when placed on the ground, so that, when it is desired once more to mount the assembly on the implement carrier, the machine cannot operate perfectly without preliminary attention. Furthermore, there is no possibility of employing the combine-harvester machine as a static machine whilst in this condition.

The object of the present invention is to obviate or mitigate the foregoing disadvantages and to provide an improved method of mounting and dismounting a combine-harvester on and from a vehicle enabling employment of the combine-harvester in both the mounted and dismounted positions.

In accordance with the invention we provide a method of mounting a combine-harvester machine on an implement carrier which can be employed for agricultural purposes and which is provided with a driving axle with engine and gear unit connected to a steering axle by a chassis frame for the mounting of work-implements, said method comprising forming said chassis frame with an open side, fitting a collapsible mobile supporting means to the combine-harvester, moving the combine-harvester into said chassis through said open side, collapsing said mobile supporting means to set the harvester down on said chassis, and detachably securing the harvester to said chassis, dismounting of the harvester from said chassis being effected by a reversal of the three last-mentioned steps.

Also in accordance with the present invention we provide in combination a self-propelled implement carrier and a combine-harvester for mounting thereon and dismounting therefrom; said carrier comprising a chassis frame open on one longitudinal side, axles, an engine and a gear unit mounted on said frame, and a wheel base mounted on said axles; and said harvester comprising a frame mountable on said chassis frame, means for detachably securing the two frames together in superposed relation, and collapsible mobile supporting means mounted on said harvester frame and adapted in operative position to elevate the latter to a higher level than said chassis frame for the purpose of moving the harvester through said open side of the chassis frame to and from a chassis-frame-overtopping position and when collapsed with the harvester in the latter position to lower said harvester frame on to said chassis frame.

Preferably, said collapsible mobile supporting means comprises at least two supports mounting wheels.

The combine-harvester frame projects on all sides beyond the mobile supporting means so that, after being propelled into position from one side, the harvester frame then lies directly above the cross-members of the chassis frame of the implement carrier. The harvester frame can then simply be lowered into position on said chassis frame and detachably secured thereto. The combine-harvester is thus conveyed firstly parallel to itself and at a right-angle to the implement carrier, whereupon it is lowered.

For the carrying out of this method it is necessary that the chassis of the implement carrier, comprising in the known manner either one side member or two parallel longitudinal members connecting the driving axle to the steering axle, is constructed in such a manner that one chassis member together with the driving axle and steering-axle forms a frame open on one side. Thus, in the case where two parallel chassis members are provided, one of these can be partly or wholly removed. When this is done the mobile combine-harvester body can then be propelled into the open frame of the carrier chassis. Thereupon, either the frame is again completed by inserting the removed chassis member or the combine-harvester body itself replaces the missing element and provides the necessary strengthening of the chassis.

The mobile supporting means preferably comprises four props disposed at the apices of a rectangle, each being of L-section and formed at its lower end as a tube for connection of the axles of the ground wheels. The four lateral props are provided with pins which engage in suitable bores in the frame of the combine-harvester body and are secured in known manner by spring clips. Collapsible struts are pivotally connected to the side props or supports and are folded for inserting the supporting pins. When the combine-harvester body is in the raised position, these struts are then braced and secured in this position. The combine-harvester can be raised as follows; the supporting props with the struts folded are fitted from below to the frame of the combine-harvester body and disposed at an inclined angle. The implement carrier is then gently reversed to bring the supporting props or supports into the upright position, whereby the combine-harvester body, which has already been released from the chassis of the implement carrier and rests freely thereon, is then raised. The collapsible struts are then braced and secured, whereupon the combine-harvester body can be withdrawn laterally from the implement carrier. The combine-harvester body can, however, be raised in the normal manner by a jack, for the purpose of inserting the supporting pins of the mobile supports. This method of raising is particularly suitable where the ground is uneven and it is impossible to obtain a smooth raising action. In order to raise the combine-harvester for the purpose of putting same down on the mobile supporting means, a hydraulic raising device of known type, such as is commonly fitted to vehicle chassis, may alternatively be employed, particularly as the hydraulic leads can be placed neatly and conveniently in or close to the cross-members of the carrier vehicle chassis.

It is regarded as a striking advantage of the invention that the withdrawal of the complete combine-harvester device provides two completely independent working machines available immediately for operation. In winter, for example, the carrier vehicle can be employed for transport purposes and the combine-harvester unit, provided with its own drive-motor, employed as a static threshing machine.

An embodiment of the invention will now be described, by way of example, with reference to the accompanying diagrammatic drawings, wherein.

Fig. 3 shows the method of raising or elevating the combine-harvester by disposing supporting jacks obliquely therebelow and by moving the implement carrier in the direction Z;

Fig. 4 is an elevation of one of the mobile supporting jacks, and

Fig. 5 is a side view, to a larger scale, the jack shown in Fig. 4.

Figure 1:
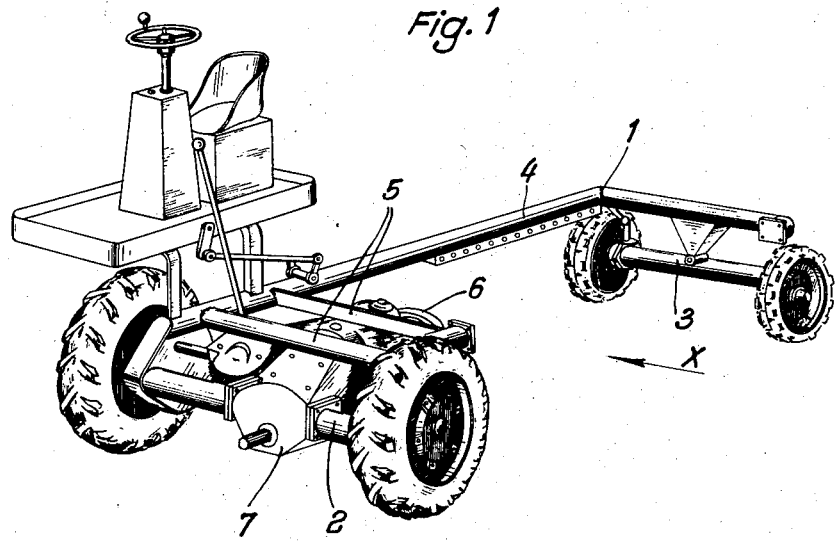
Fig. 1 is an elevation view showing the open frame of an implement carrier, the combine-harvester being driven into position in the frame from the lateral direction indicated by the direction of the arrow X.
Figure 2:
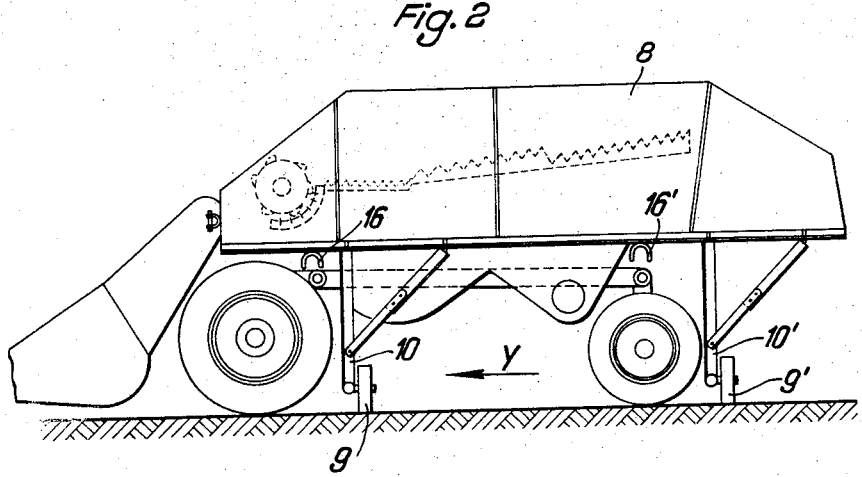
Fig. 2 is a side-elevation of a mobile combine-harvester.

Referring to the drawings, the implement carrier 1 comprises essentially a driving axle 2 and a steering axle 3 which are inter-connected by either a single longitudinal member 4 or by two longitudinal members, thereby to form a frame for the addition of work implements.

A motor 6 with a gear unit 7 is located beneath cross-members 5 of the frame near to the driving axle.

In order to build the combine-harvester 8 on to the implement carrier the harvester, which is based on the supports 10, 10' provided with wheels 9, 9', is driven into the open frame in the direction X transverse to the direction of travel of the implement carrier. Pins 11, 11' provided on the supports engage in corresponding bores in the frame 12 of the thresher housing and are secured by spring clips 13. Spring clips 13 also secure in the mutually-aligned position the two parts 14, 15 and 14', 15' respectively of collapsible struts forming portions of the supports 10, 10' respectively. When the latter spring clips 13 are released, the collapsible struts formed by the parts 14, 15 and 14', 15' are broken, so that the combine-harvester then rests only on the supports 10, 10'. If the implement carrier with the combine-harvester mounted thereon is now moved in the direction Y, the supports 10, 10' are pivoted at their upper ends and are inclined therefrom in the direction Z opposite to the direction Y and the harvester body is thus lowered on to the frame or chassis of the implement carrier. The harvester body is supported on U-shaped bearings 16, 16' provided in the known manner with quick-release locking means. On removal of the supporting legs, the implement carrier is now ready for employment as a self-propelled combine-harvester.

Dismounting of the combine-harvester body is carried out in the reverse order to that described, i.e. the supporting legs 10, 10' are placed obliquely beneath the combine-harvester body and the implement carrier is moved in the direction Z. This brings the supporting legs 10, 10' into the erect position and the combine-harvester body is raised in its bearings 16, 16' from the implement carrier. The collapsible struts 14, 15 and 14', 15' are then straightened once again and the spring clips 13 are again inserted to secure the struts and legs. The combine-harvester can now be withdrawn laterally from the frame of the implement carrier and employed for static operation.

The embodiments of the invention in which an exclusive property or privilege is claimed are defined as follows:

1. Apparatus for handling a load, comprising in combination with an implement carrier having a longitudinal frame member, a front cross frame member connected to one end of said longitudinal frame member and extending perpendicularly thereto, a rear cross frame member connected to the other end of said longitudinal frame member and extending perpendicularly thereto, said three frame members extending substantially in the same horizontal plane, a driving axle, a motor connected with said driving axle and said front cross frame member, a steering axle connected to said rear cross frame member, and wheels carried by said axles and extending in the direction of said longitudinal frame member; a combine-harvester having a horizontal frame, collapsible struts pivotally connected to the last-mentioned frame and movable from an upright position to a collapsed position and vice versa, said struts being located on opposite sides of the last-mentioned frame, means connected with said struts for locking them in the upright position, and wheels carried by said struts and extending perpendicularly to the direction of the first-mentioned wheels, the last-mentioned wheels maintaining the last-mentioned horizontal frame at a level higher than that of the horizontal plane of the three frame members of said implement carrier when said struts are in said upright position, whereby the combine-harvester may be moved into the space enclosed by the three frame members of said implement carrier and thereupon the frame of said combine-harvester may be placed upon the three frame members by moving said struts to said collapsed position.

2. Apparatus for handling a load, comprising in combination with an implement carrier having a longitudinal frame member, a front cross frame member connected to one end of said longitudinal frame member and extending perpendicularly thereto, a rear cross frame member connected to the other end of said longitudinal frame member and extending perpendicularly thereto, said three frame members extending substantially in the same horizontal plane, a driving axle, a motor connected with said driving axle and said front cross frame member, a steering axle connected to said rear cross frame member, and wheels carried by said axles and extending in the direction of said longitudinal frame member; a combine-harvester having a horizontal frame, collapsible struts pivotally connected to the last-mentioned frame and movable from an upright position to a collapsed position and vice versa, said struts being located on opposite sides of the last-mentioned frame, pivotally interconnected pairs of links pivotally connected to said struts and the last-mentioned frame, spring clips adapted to engage said links for locking said struts in the upright position, wheels carried by said struts and extending perpendicularly to the direction of the first-mentioned wheels, the last-mentioned wheels maintaining the last-mentioned horizontal frame at a level higher than that of the horizontal plane of the three frame members of said implement carrier when said struts are in said upright position, whereby the combine-harvester may be moved into the space enclosed by the three frame members of said implement carrier, and U-shaped bearings carried by the last-mentioned frame and extending toward and directly above said front and rear cross frame members when said combine-harvester is moved into said space, whereby said U-shaped bearings may engage said front and rear cross frame members and the frame of said combine-harvester may be placed upon the three frame members by moving said struts to said collapsed position.

References Cited in the file of this patent

UNITED STATES PATENTS

| | | |
|---|---|---|
| 766,956 | Lennon | Aug. 9, 1904 |
| 2,304,622 | Barrett | Dec. 8, 1942 |
| 2,773,614 | Edwards et al. | Dec. 11, 1956 |